Figure 1:
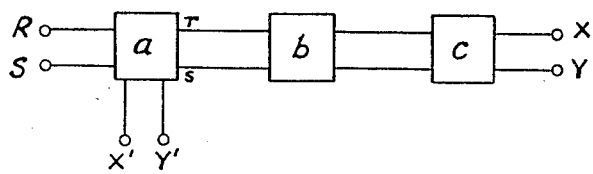

Nov. 19, 1940.  S. A. STEVENS ET AL  2,222,048
APPARATUS FOR THE PRODUCTION OF ELECTRIC OSCILLATIONS
Filed Feb. 21, 1940

INVENTORS
Sydney Arthur Stevens and
Alec Hervey Bennett Walker.
BY
THEIR ATTORNEY.

Patented Nov. 19, 1940

2,222,048

UNITED STATES PATENT OFFICE 2,222,048

APPARATUS FOR THE PRODUCTION OF ELECTRIC OSCILLATIONS

Sydney Arthur Stevens and Alec Hervey Bennett Walker, London, England, assignors, by mesne assignments, to The Union Switch & Signal Company, Swissvale, Pa., a corporation of Pennsylvania Application February 21, 1940, Serial No. 320,166
In Great Britain November 23, 1938

5 Claims. (Cl. 172—281)

This invention relates to apparatus for the production of electrical oscillations and has for its object to provide improved apparatus of this character adapted to be operated from an alternating current supply circuit and to produce oscillations of a frequency which can be arranged to have any desired value lower than the frequency of the supply circuit.

According to the invention a tuned oscillation circuit is supplied with energy through a rectifier, from a circuit traversed by current derived from the alternating current supply circuit and having a rising voltage-current or negative resistance characteristic, the required output of current oscillating at a frequency dependent upon the characteristics of the oscillation circuit being derived from this circuit.

In one form of the invention one or more inductances and condensers are connected in series across the alternating current supply circuit, a circuit including or inductively related to one or more of the series connected elements in such a manner as to have a negative resistance characteristic being arranged to supply current through the rectifier to the tuned oscillation circuit from which the required output of current is derived.

The apparatus may comprise a condenser connected in series with a choke coil having a magnetic core provided with a suitable air-gap across the alternating current supply circuit, a magnetically saturated choke coil being connected in parallel with the condenser, and a circuit including a winding of the air-gap choke coil may be arranged to supply current to the input terminals of a rectifier system of the dry surface contact type the output terminals of which are connected to the tuned circuit. The circuit from which the tuned circuit is supplied may also include a winding on the core of the saturated choke coil in series with the winding of the air-gap choke coil or a secondary winding on the core of this coil.

In another form of the invention the input terminals of the rectifier may be connected to the supply circuit in series with the winding of a choke coil device having a saturating winding supplied with rectified current from the rectifier output and arranged to cause the alternating current voltage applied to the rectifier input terminals to increase rapidly as the current increases.

In all cases the output of oscillating current may be obtained from the tuned circuit or, by suitable connection to the element of negative resistance characteristic connected to the supply circuit, a carrier current of the supply-circuit frequency having a modulation superposed thereon of the tuned circuit frequency may be obtained.

Figure 2:
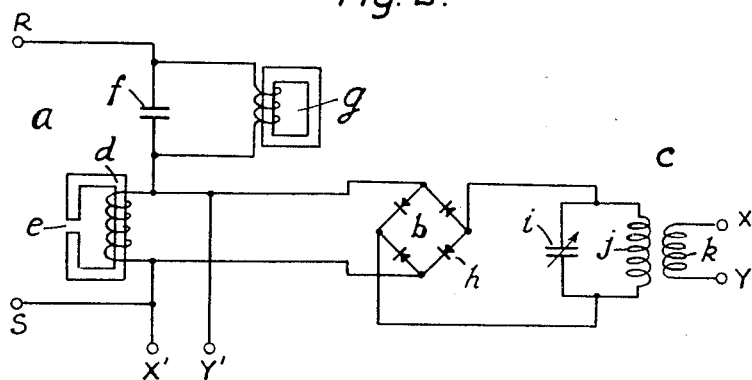
Figure 3:
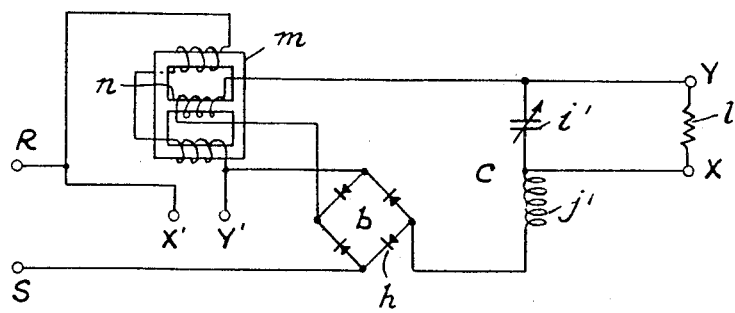

In order that the present invention may be more readily understood, it will now be described with reference to the accompanying drawing, of which Figure 1 is a schematic diagram illustrating the principle of the invention, while Figures 2 and 3 are circuit diagrams of two systems embodying the invention by way of example.

Referring first to the schematic diagram of Figure 1, R and S are the two poles of an alternating-current supply, which are connected to a circuit arrangement $a$ forming the equivalent of a source of alternating current having a negative internal resistance between the terminals $r$ and $s$, which are connected to a rectifier device $b$, the rectified current being conducted to a resonant circuit $c$ tuned for the desired frequency, this circuit being provided with load terminals X and Y. Further load terminals X' and Y' are provided on the unit $a$, and it will be evident that owing to the presence of the tuned circuit $c$ constituting an oscillatory load these terminals X' and Y' can be so arranged as to supply a voltage corresponding to the alternating voltage of the supply circuit R, S modulated in accordance with the natural frequency of the tuned circuit.

Obviously either the terminals X, Y or the terminals X', Y' may be omitted if current of the character supplied by them is not required.

Figure 2 is a circuit diagram illustrating, one form of apparatus embodying the invention in which the unit $a$ comprises a non-saturated choke coil $d$ having an air gap $e$, which is connected across the alternating-current supply terminals R and S in series with a condenser $f$, a saturated choke coil $g$ being connected in parallel with the condenser. It has been found that when an arrangement of this type is connected to a source of alternating current in the manner described, the two terminals of the choke coil $e$ are equivalent to the terminals of a source of alternating current having a negative internal resistance, and this source is utilised for supplying current through the rectifier system $b$ which may be a Graetz system of dry surface contact rectifiers $h$ to the oscillating circuit $c$, which is constituted in this example by a variable condenser $i$ connected in parallel with a reactance coil $j$, the load terminals X and Y being provided on a secondary winding $k$ of the coil $j$, while the terminals X' and Y' are at the ends of the choke coil d.

In another arrangement embodying the invention, and illustrated in Figure 3, a source of alternating current having the equivalent of a negative resistance is obtained by connecting in series with an alternating current supply circuit having supply terminals R and S a choke coil m provided with a saturating winding n energised with direct current in series with the tuned circuit c supplied with current from this source through the rectifier system b. The tuned circuit in this example is constituted by a variable condenser i' connected in series with a reactance coil j', the two ends of the condenser i' being utilised as load terminals X and Y for the supply of oscillating current, while current comprising a carrier wave of the frequency of the alternating current supply circuit and modulated in accordance with the natural frequency of the tuned circuit can be derived from the terminals X' and Y' of the choke coil m, a path l for direct current being in each case provided across the condenser i'.

It will be apparent that the invention is not limited to the particular systems above described, it being obviously possible to obtain, for example, an oscillating current from the terminals of the variable condenser i' or to provide terminals X' and Y' at the input terminals of the rectifier system b, or to combine the individual features shown in Figures 2 and 3 in various different ways.

Various other arrangements and connections may evidently be utilised in carrying the invention into practice.

Having now particularly described and ascertained the nature of our said invention and in what manner the same is to be performed, we declare that what we claim is:

1. Apparatus for the production of electric oscillations comprising in combination, a source of alternating current, a circuit deriving current from said source and having a negative resistance-voltage characteristic, a rectifier, means for impressing the voltage of said circuit across the input terminals of said rectifier, and a tuned circuit connected across the output terminals of said rectifier and having a predetermined natural frequency of oscillation, whereby load current oscillating at said predetermined frequency is obtainable by connecting a load with said tuned circuit.

2. Apparatus for the production of electric oscillations comprising in combination, a source of alternating current of given frequency, a circuit deriving current from said source and having a negative resistance-voltage characteristic, a rectifier, means for impressing the voltage of said circuit across the input terminals of said rectifier, and a tuned circuit connected across the output terminals of said rectifier and having a predetermined natural frequency of oscillation, said tuned circuit reacting through said rectifier upon said first mentioned circuit to modulate said given frequency at the frequency of said predetermined oscillations, whereby alternating current modulated at said predetermined frequency is obtainable by connecting a load with said first mentioned circuit.

3. Apparatus for the production of electric oscillations comprising in combination, a source of alternating current having a negative resistance-voltage characteristic, a rectifier having its input terminals connected to receive energy from said source, and a tuned circuit connected across the output terminals of said rectifier and having a predetermined natural frequency of oscillation, whereby load current oscillating at said predetermined frequency is obtainable by connecting a load with said tuned circuit.

4. Apparatus for the production of electric oscillations comprising in combination, a source of alternating current, a condenser and a choke coil connected in series across said source, said choke coil being so designed that its core is incapable of becoming saturated, a magnetically saturated choke coil connected across said condenser, the parts being proportioned in such manner that said non-saturated choke coil has a negative resistance-voltage characteristic, a rectifier having its input terminals energized from a circuit which includes the winding of said non-saturated choke coil, and a tuned circuit having a predetermined natural frequency of oscillation connected across the output terminals of said rectifier.

5. Apparatus for the production of electric oscillations comprising in combination, a source of alternating current, a saturable choke having an impedance winding and a saturating winding, a rectifier having its input terminals connected across said source in series with said impedance winding, a tuned circuit connected across the output circuit of said rectifier in series with said saturating winding, and a load connected across an element of said tuned circuit.

SYDNEY ARTHUR STEVENS.
ALEC HERVEY BENNETT WALKER.